(12) United States Patent
Raymond

(10) Patent No.: US 12,253,434 B2
(45) Date of Patent: Mar. 18, 2025

(54) HYDROCARBON LEAK DETECTION CABLE

(71) Applicant: Raymond & Lae Engineering, Inc., Fort Collins, CO (US)

(72) Inventor: Donald M. Raymond, Fort Collins, CO (US)

(73) Assignee: Raymond & Lae Engineering, Inc., Fort Collins, CO (US)

( * ) Notice: Subject to any disclaimer, the term of this patent is extended or adjusted under 35 U.S.C. 154(b) by 0 days.

(21) Appl. No.: 18/367,007

(22) Filed: Sep. 12, 2023

(65) Prior Publication Data
US 2024/0003772 A1    Jan. 4, 2024

Related U.S. Application Data

(62) Division of application No. 17/235,156, filed on Apr. 20, 2021, now Pat. No. 11,788,917.

(60) Provisional application No. 63/024,985, filed on May 14, 2020.

(51) Int. Cl.
G01M 3/16    (2006.01)
G01M 3/04    (2006.01)

(52) U.S. Cl.
CPC ............ *G01M 3/047* (2013.01); *G01M 3/165* (2013.01)

(58) Field of Classification Search
CPC ................................................ G01M 3/16–188
See application file for complete search history.

(56) References Cited

U.S. PATENT DOCUMENTS

| | | | |
|---|---|---|---|
| 4,029,889 A | 6/1977 | Mizuochi | |
| 4,487,057 A | 12/1984 | Lutz | |
| 4,877,923 A | 10/1989 | Sahakian | |
| 5,177,996 A | 1/1993 | Sahakian | |
| 5,203,202 A | 4/1993 | Spencer | |
| 5,341,128 A | 8/1994 | Keyser et al. | |
| 10,784,584 B1 | 9/2020 | McNutt | |
| 2009/0301172 A1 | 12/2009 | Raymond | |
| 2011/0037483 A1 | 2/2011 | Scheuermann et al. | |
| 2012/0098555 A1 | 4/2012 | Raymond | |
| 2014/0130350 A1 | 5/2014 | Raymond | |
| 2016/0238547 A1 | 8/2016 | Park et al. | |

OTHER PUBLICATIONS

Zhang et al.; "The Permeability Characteristics of Silicone Rubber"; SAMPE—Society for the Advancement of Material and Process Engineering Fall Technical Conference 2006, "Global Advances in Materials and Process Engineering" proceedings, Coatings and Sealants Section, Nov. 6-9, 2006, Dallas, TX, USA; https://imageserv5.team-logic.com/mediaLibrary/99/D116_20Haibing_20Zhang_20et_20al.pdf; 10 pages.

Gugliuzza et al.; "Membranes for hydrocarbon fuel processing and separation"; Advanced Membrane Science and Technology for Sustainable Energy and Environmental Applications, Woodhead Publishing Series in Energy, pp. 295-338; https://doi.org/10.1533/9780857093790.3.295; Aug. 2011; 2 pages.

(Continued)

*Primary Examiner* — Alexander A Mercado
(74) *Attorney, Agent, or Firm* — William W. Cochran; Cochran Freund & Young LLC

(57) ABSTRACT

Disclosed are embodiments of hydrocarbon leak detection cables that utilize time domain reflectometry to indicate the location of changes in impedance in a hydrocarbon leak detection cable. In addition, an embodiment of a hydrocarbon leak detection optical fiber is disclosed.

20 Claims, 10 Drawing Sheets

(56) References Cited

OTHER PUBLICATIONS

Nam et al.; "Petrogel: New Hydrocarbon (Oil) Absorbent Based on Polyolefin Polymers"; American Chemical Society, Macromolecules, vol. 49, pp. 5427-5437, University Park, PA, USA; https://pubs.acs.org/doi/10.1021/acs.macromol.6b01244; Jul. 25, 2016; 10 pages.

HYDROCARBON LEAK DETECTION CABLE

CROSS-REFERENCE TO RELATED APPLICATIONS

The present U.S. Utility Patent Application claims priority pursuant to 35 U.S.C. § 120 as a divisional of U.S. Utility application Ser. No. 17/235,156, entitled, "HYDROCARBON LEAK DETECTION CABLE," filed on Apr. 20, 2021 and is incorporated herein by reference in its entirety and made part of the present U.S. Utility Patent Application for all purposes.

BACKGROUND

Monitoring of leaks of hydrocarbons such as oil, gas, and other petroleum fluids is important in protecting the environment. Hydrocarbon leaks can occur from both underground and above ground storage tanks, pipelines, petroleum fluid transfer pipes and tubing and machinery that runs on petroleum fluids, such as diesel generators, etc. Leaks can contaminate the ground water table which can cause serious harm to a geographical area. Detection of leaks prior to contaminations by hydrocarbons and petroleum fluids is therefore advantageous and important in the oil and gas industry.

SUMMARY

An embodiment of the present invention may therefore comprise: a method of detecting hydrocarbon leaks using a hydrocarbon leak detection cable comprising: providing a hydrocarbon leak detection cable having a hydrocarbon reactive polymer that expands in the presence of hydrocarbons and generates forces that move a conductive sheath closer to a center conductor of the hydrocarbon leak detection cable which changes impedance of the hydrocarbon leak detection cable at a location where the hydrocarbons are contacting the hydrocarbon leak detection cable; using a time domain reflectometer to detect the location on the hydrocarbon leak detection cable.

An embodiment of the present invention may further comprise: a method of detecting a location of a hydrocarbon leak in a hydrocarbon leak detection cable comprising: using a layer of hydrocarbon reactive polymer that functions as an electrical shield in the hydrocarbon leak detection cable, and that surrounds a center conductor at a predetermined distance which creates a predetermined input impedance of the hydrocarbon leak detection cable, the hydrocarbon reactive polymer having conductive particles dispersed in the hydrocarbon reactive polymer which causes the hydrocarbon reactive polymer to be conductive and function as an electrical shield; detecting a hydrocarbon leak at the location on the hydrocarbon leak detection cable by allowing liquid hydrocarbon from the hydrocarbon leak to penetrate the hydrocarbon leak detection cable at the location causing the hydrocarbon reactive polymer to absorb the liquid hydrocarbon, which causes the hydrocarbon reactive polymer to swell so that the conductive particles move away from each other thereby reducing conductivity of the layer of hydrocarbon reactive polymer and causing the hydrocarbon leak detection cable to change impedance at the location; using a time domain reflectometer to determine where on the hydrocarbon leak detection cable the change of impedance has occurred to determine the location of the hydrocarbon leak.

An embodiment of the present invention may further comprise: a method of detecting a hydrocarbon leak comprising: providing a hydrocarbon leak detection cable having a hydrocarbon reactive polymer that expands when placed in contact with liquid hydrocarbons and generates forces that move a conductive sheath away from a center conductor in the hydrocarbon leak detection cable, causing a change in impedance of the hydrocarbon leak detection cable at a location where the liquid hydrocarbons contact the hydrocarbon leak detection cable; using a time domain reflectometer to detect the location on the hydrocarbon leak detection cable.

An embodiment of the present invention may further comprise: a method of detecting a hydrocarbon leak comprising: providing a hydrocarbon leak detection optical cable having a hydrocarbon reactive polymer that creates a reflective interface with a fiber optic filament to reflect light that is transmitted through the fiber optic filament, the reflective interface being altered when liquid hydrocarbons contact the hydrocarbon reactive polymer, causing the reflective interface to scatter light; detecting the scattered light to determine a location of the hydrocarbon leak.

An embodiment of the present invention may further comprise: a method of detecting a hydrocarbon leak comprising: providing a hydrocarbon leak detection optical cable having a hydrocarbon permeable cladding that creates a reflective interface with a fiber optic filament to reflect light that is transmitted through the fiber optic filament, the reflective interface being altered when liquid hydrocarbons contact the reflective interface, causing the reflective interface to scatter light; detecting the scattered light to determine a location of the hydrocarbon leak.

An embodiment of the present invention may further comprise: a method of detecting a hydrocarbon leak comprising: providing a hydrocarbon leak detection cable having a shaped dielectric that covers a center conductor, and a hydrocarbon permeable membrane that covers the shaped dielectric and forms spaces between the shaped dielectric and the hydrocarbon permeable membrane, and a hydrocarbon permeable conductive sheath that covers the hydrocarbon permeable membrane which provides a conductive shield for the center conductor which creates a predetermined input impedance of the hydrocarbon leak detection cable, the hydrocarbon permeable membrane and the hydrocarbon permeable conductive sheath allowing liquid hydrocarbons from a hydrocarbon leak to penetrate the hydrocarbon permeable membrane and the hydrocarbon permeable conductive sheath and collect in the spaces between the shaped dielectric and the hydrocarbon permeable membrane which changes impedance of the hydrocarbon leak detection cable at a location where the liquid hydrocarbons penetrate the hydrocarbon permeable membrane and the hydrocarbon permeable conductive sheath; using a time domain reflectometer to detect the location.

DETAILED DESCRIPTION OF THE EMBODIMENTS

Figure 1:
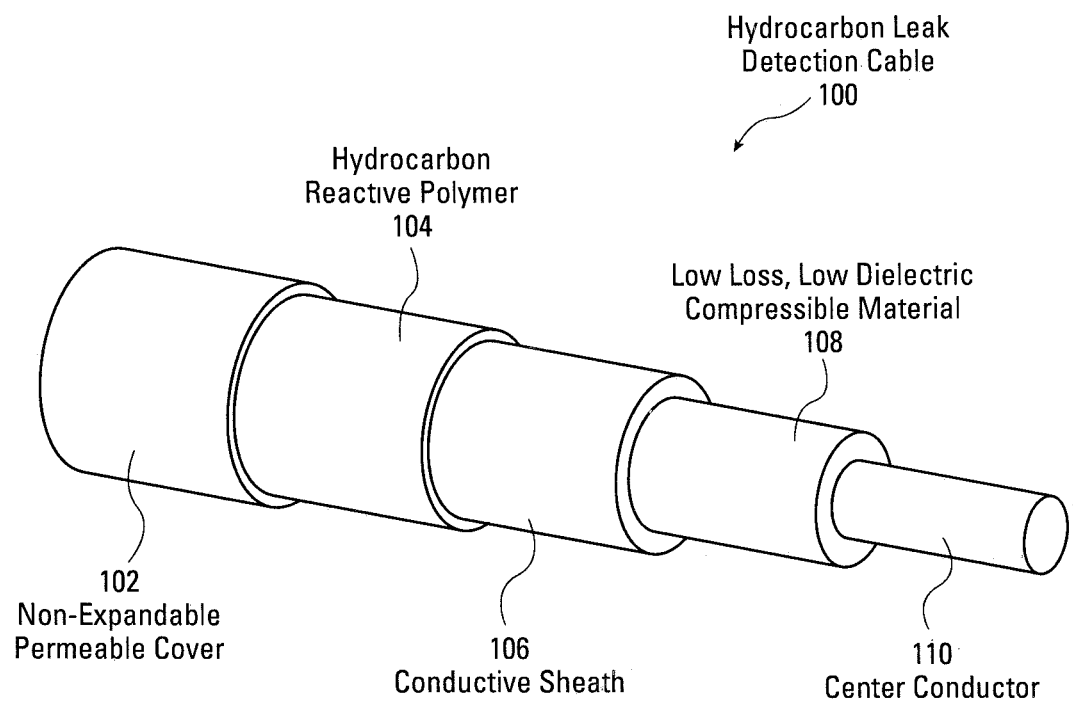
FIG. 1 is a partial cut-away view of an embodiment of a hydrocarbon detection cable.

FIG. 1 is a partial cut-away view of an embodiment of a hydrocarbon leak detection cable 100. As illustrated in FIG. 1 the hydrocarbon leak detection cable 100 has an outer non-expandable permeable cover 102. The non-expandable permeable cover 102 is intended to protect the hydrocarbon leak detection cable 100 from abrasions, punctures and other potential damage. The non-expandable permeable cover 102 may be constructed from a plastic monofilament fiber that is braided in a manner that provides protection to the underlying layers. The monofilament fiber can be constructed from various plastics, and normally has a coverage of approximately 80%, so that 20% of the surface of the non-expandable permeable cover 102 is open to allow the passage of various liquids including hydrocarbons. Of course, those percentages can be used including 90/10, 70/30, for example. The non-expandable permeable cover 102 may also be made from various types of polymer tape having perforations to allow the passage of a liquid such as liquid hydrocarbons. Various other types of materials can be used to produce the non-expandable permeable cover 102 which does not allow substantial expansion as a result of forces created by the hydrocarbon reactive polymer layer 104. In the regard, substantial expansion means that the non-expandable permeable cover 102 expands by more than about 10% of its diameter.

Under the non-expandable permeable cover 102, illustrated in FIG. 1, is a hydrocarbon reactive polymer 104. In that regard, each of the layers or coverings illustrated in all of the embodiments may include additional layers. So, for example, in FIG. 1, there are four different layers illustrated that surround or cover the center conductor 110. However, other additional layers may exist, and it should be understood by those skilled in the art that the description provided herein, and the claims set forth, a structure which may include additional layers or coverings. Terms such as "under," "cover," "on," "surrounds" and similar terms do not mean that any particular layer is directly connected to or directly adjacent to any other layer, but rather, other layers can exist in the structures in the embodiments disclosed. Further, these terms do not mean or imply "complete," but may be "partial."

Referring again to FIG. 1, hydrocarbons that pass through the non-expandable permeable cover 102 react with the hydrocarbon reactive polymer 104 which expands or swells when subjected to, or placed in contact with, hydrocarbons. The hydrocarbon reactive polymer 104 may comprise a petroleum fluid gel which absorbs hydrocarbons and is based upon polyolefin polymers. Polyolefin-based hydrophobic absorbance demonstrates selective absorption of hydrocarbon molecules in water solutions. This is more fully disclosed in a publication of the American Chemical Society relating to "*Macromolecules*" entitled "Petro gel: New Hydrocarbon (oil) Absorbent Based on Polyolefin Polymers" by Changwlo Nam, Houxiang Li, Gang Zhang, and T. C. Mike Chung, Department of Material Science and Engineering, the Pennsylvania State University, University Park, Pennsylvania 16802. In general, various rubber and nitrile-based materials are capable of absorbing hydrocarbons and swell in three dimensions as a result of the absorption of the hydrocarbons. These polymers absorb the hydrocarbon liquid and swell which creates a reactive force on the non-expandable permeable cover 102 so that the forces created by the swelling are all directed inwardly towards the conductive sheath 106.

The conductive sheath 106, illustrated in FIG. 1, can be made of stainless steel, copper, a conductive polymer coated mesh, tin plated copper or any type of conductive material that may function as a shield. The term "sheath" is used to mean a protective covering around an electrical cable. The term "sheath" is synonymous with the term "shield" as used in shielded cables since conductive sheaths, as used herein, such as conductive sheath 106, provides shielding to a surrounded center conductor such as center conductor 110. The conductive sheaths disclosed herein provide shielding such as provided by a Faraday cage and also provide a conductive path that extends along the cable for detecting multiple leaks. The conductive sheath 106 provides shielding so that the hydrocarbon leak detection cable 100 has a preset or predetermined input impedance. For example, the hydrocarbon leak detection cable 100 may have a 50 ohm input impedance which is determined by the spacing between the conductive sheath 106 and the center conductor 110. This spacing is also affected by the material used for the low loss, low dielectric compressible material 108. The amount of spacing between the conductive sheath 106 and the center conductor 110, to achieve a particular input impedance, is dependent upon the dielectric constant of the low loss, low dielectric compressible material 108. For example, various materials can be used for the low loss, low dielectric compressible material 108, such as a silicon, rubber foam, any polymer-based foams or other compressible material. Since air has a dielectric constant of one, a foam material provides a large amount of air which will create a low dielectric constant for the low loss, low dielectric compressible material 108. Of course, the lower the dielectric constant of the low loss, low dielectric material 108, the less spacing is required between the center conductor 110 and the conductive sheath 106 to obtain the desired impedance. The center conductor 110, of course can be made of any conductive material such as copper or other wire or conductive material.

The hydrocarbon leak detection cable 100 may be placed in locations that are difficult to access in order to detect hydrocarbon leaks. The hydrocarbon leak detection cable 100 may be placed in a perforated pipe that can be disposed in various locations, such as under above ground tanks, under below ground tanks, under a pipeline that rests in sand, etc. The hydrocarbon leak detection cable 100 may also be placed in a containment pipe of a double wall pipeline or transmission pipe, in a containment tank located under an underground tank and other locations that are difficult to access. It is therefore advantageous to be able to reuse the hydrocarbon leak detection cable 100. In that regard, the hydrocarbon leak detection cable 100 can be dried out after a hydrocarbon leak has been sealed so that the hydrocarbon reactive polymer 104 returns to its normal size prior to absorption of hydrocarbons. In that case, the low loss, low dielectric compressible material 108 should be made from a material that can return to its original size after being compressed. Many rubbers and synthetic foams including silicon foams are capable being compressed and then expanding to an original size after being compressed.

In addition, the hydrocarbon leak detection cable 100 can be cleaned using various methods to remove hydrocarbons. For example, various solvents and soaps, including isopropyl alcohol, glycerin, propylene glycol have been used to remove the hydrocarbons.

Alternatively, materials can be used that do not return to their normal size prior to absorption of hydrocarbons and as such, the cable can simply be replaced. In many applications, this simply requires cable pulling to replace the cable with a new cable. These types of cables may be less expensive to implement and may be more reliable since some materials simply do not return fully to their pre-expanded size. As such, the embodiments disclosed herein, as well as the claims may refer to the use of materials that may be either reusable or may not be reusable and require replacement.

In many applications, the hydrocarbon leak detection cable 100 may be laid out over a long distance to locate the position of any leak. For example, the hydrocarbon leak detection cable 100 can be used to locate the position of a leak in a long pipeline. Similarly, if there is a large underground tank, the hydrocarbon leak detection cable 100 can be used to locate the position of the leak with regard to the tank so that the location of excavation around the tank can be determined for sealing leaks.

The location of the leak on a leak detection cable can be determined by using time domain reflectometry (TDR). TDR uses the concept of measuring reflections along a conductor. A time domain reflectometer generates an interrogation pulse that is transmitted along the conductor. A change in impedance along the conductor will create a reflected wave in the conductor. As long as the conductor has a substantially uniform impedance along its length, such as 50 ohms, and is properly terminated, then no reflections will be detected, and the interrogation pulse generated by the time domain reflectometer is absorbed at the far end by proper termination of the cable. If there is an impedance variation somewhere along the cable, the pulse will be reflected back to the source. The location of the reflection, and the change in impedance, on the cable is easily determined by measuring the time lapse between the generation of the interrogation pulse and the reception of the reflected signal.

Figure 2:
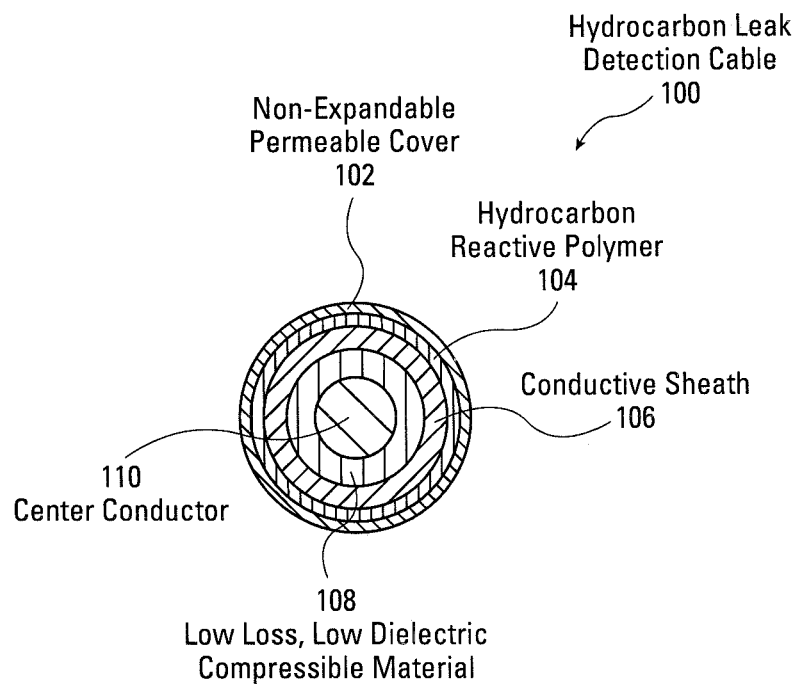
FIG. 2 is a cross-sectional view of the embodiment of the hydrocarbon leak detection cable of FIG. 1.

FIG. 2 is a cross-section view of the hydrocarbon leak detection cable 100 illustrated in FIG. 1. As illustrated in FIG. 2, the non-expandable permeable cover 102 surrounds the hydrocarbon leak detection cable 100. The non-expandable permeable cover 102 allows hydrocarbons to seep through the non-expandable permeable cover 102 and contact the hydrocarbon reactive polymer layer 104. The hydrocarbon reactive polymer 104 functions to swell or expand when the hydrocarbon reactive polymer 104 absorbs hydrocarbons allowed to pass through the non-expandable permeable cover 102. The non-expandable permeable cover 102 directs the forces of the expansion of the hydrocarbon reactive polymer 104 in an inward direction to compress the conductive sheath 106 inwardly. The forces on the conductive sheath 106 cause the low loss, low dielectric compressible material 108 to compress so that the conductive sheath 106 moves closer to the center conductor 110. When the conductive sheath 106 moves closer to the center conductor 110, the impedance of the hydrocarbon leak detection cable 100 changes at the location where the hydrocarbon has penetrated the hydrocarbon leak detection cable 100. The change in impedance of the hydrocarbon leak detection cable 100 at that location causes a reflection of an interrogation pulse wave generated by a time domain reflectometer so that a reflected wave is transmitted back towards the origin of the interrogation pulse wave. A time domain reflectometer detects the reflected pulse wave and measures the time between the generation of the interrogation pulse and the reception of the reflected pulse. That elapsed time is an indication of a location of the change of impedance in the hydrocarbon leak detection cable 100 so that the location of the hydrocarbon leak can be determined.

Figure 3:
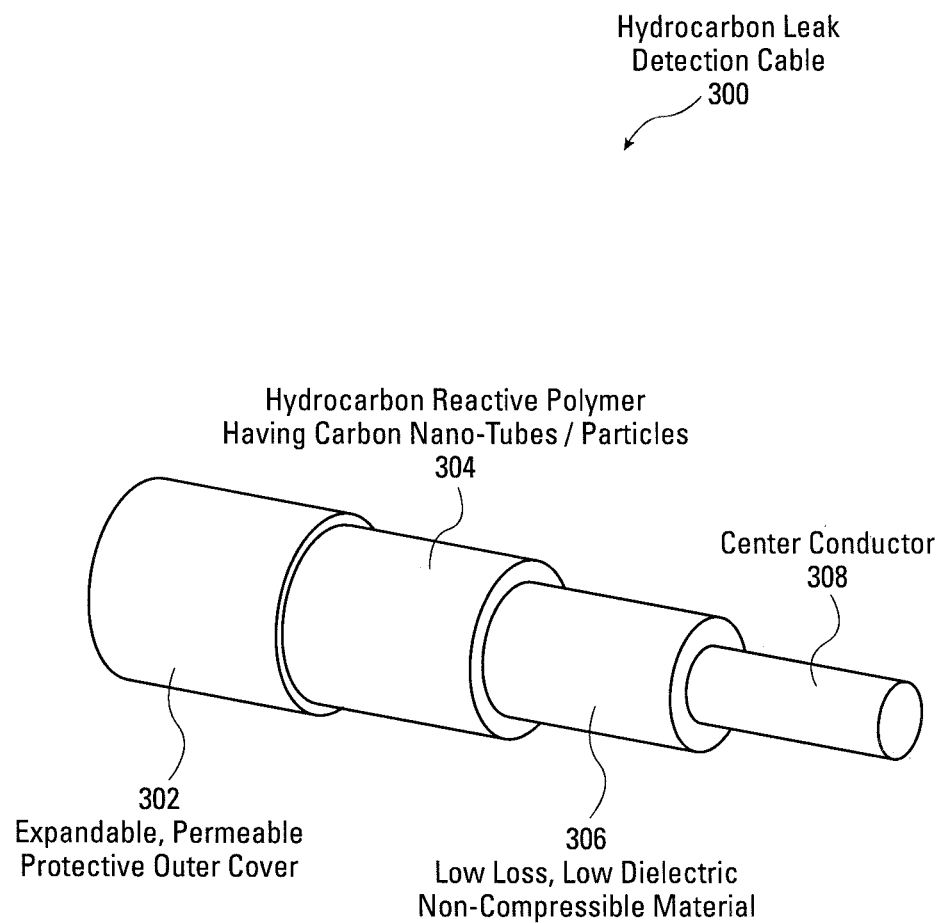
FIG. 3 is a partial cut-away view of another embodiment of the hydrocarbon detection cable.

FIG. 3 is a schematic cut-away view of another embodiment of a hydrocarbon leak detection cable 300. As illustrated in FIG. 3, the hydrocarbon leak detection cable 300 has an outer expandable, permeable protective outer cover 302. The expandable, permeable protective outer cover 302 may be made from expandable materials that can expand and then contract to their original size. Non-contracting outer covers can also be used. The expandable, permeable protective outer cover 302 is also permeable to liquid hydrocarbons which can seep through the expandable, permeable protective outer cover 302 and penetrate the hydrocarbon reactive polymer 304, which contains carbon nanotubes and/or conductive particles such as carbon particles or other conductive particles or elements. The expandable, permeable protective outer cover 302 provides protection against punctures and is wear resistant. The expandable, permeable protective outer cover 302 also may be made from a conductive material that provides conduction throughout the length of the hydrocarbon leak detection cable 300, even though a local leak has been detected. The conduction can be provided by a conductive coating of various expandable materials, or simply by providing an expandable wire braid, such as a copper wire braid, as part of the expandable, permeable protective outer cover 302, or as a separate inner layer. Using a conductive expandable, permeable protective outer cover 302 allows conduction along the length of the cable 300 so that multiple leaks can be detected along the length of cable 300.

The hydrocarbon reactive polymer 304, illustrated in FIG. 3, may have carbon-nanotubes and/or carbon particles or other conductive particles or conductive elements dispersed throughout the polymer material so that the hydrocarbon reactive polymer 304 is conductive and creates a conductive shield for the hydrocarbon leak detection cable 300. The impedance of the hydrocarbon leak detection cable 300 is created by the spacing between the hydrocarbon reactive polymer 304, which acts as a conductive shield, and the center conductor 308. Low loss, low dielectric non-compressible material 306 is disposed between the hydrocarbon reactive polymer layer 304 and the center conductor 308. Depending upon the dielectric constant of the low loss, low dielectric non-compressible material 306, and the spacing between the hydrocarbon reactive polymer 304 and the center conductor 308, the input impedance of the hydrocarbon leak detection cable 300 can be established. In other words, the low loss, low dielectric non-compressible material 306 may have a higher dielectric constant which will require that the low loss, low dielectric non-compressible material 306 be thicker than the compressible foam layer 108 illustrated in FIGS. 1 and 2. In order to maintain an input impedance of 50 ohms for the hydrocarbon leak detection cable 300, a thicker layer of non-compressible material may be required. The low loss, low dielectric non-compressible material 306, as well as other low loss, low dielectric non-compressible materials disclosed in other embodiments, can comprise compressible materials that may compress in response to hydrocarbon reactive polymers, such as hydrocarbon reactive polymer 304, until they simply do not compress any farther so that the hydrocarbon reactive polymer 304 expands outwardly creating spacing between the carbon nano-tubes, carbon particles or other conductive particle or conductive elements which creates a lower conductance. Since the input impedance of the cable is maintained at a pre-determined input impedance such as 50 ohms, very low dielectric materials such as foams that contain high percentage of air can be made thinner and still maintain the 50 ohm impedance. These types of high ratio air foams are very compressible but are thinner than other dielectric materials and can be compressed by a lesser amount until they are no longer compressible. These types of foams and other compressible materials may be suitable as a replacement for the low loss, low dielectric non-compressible material 306, as long as there is a sufficient amount of the hydrocarbon reactive polymer 304 to cause the low loss, low dielectric non-compressible material 306 to compress until layer 306 can compress no more, so that the hydrocarbon reactive polymer layer 304 continues to expand and create a lower conductance or loss of conductance. The same is also true for the low loss, low dielectric non-compressible material 506 of FIG. 5, as disclosed below.

When liquid hydrocarbons penetrate the expandable, permeable protective outer cover 302 and are absorbed by the hydrocarbon reactive polymer layer 304, as illustrated in FIG. 3, the hydrocarbon reactive polymer layer 304 expands outwardly, since the expandable, permeable protective outer cover 302 is expandable and the low loss, low dielectric non-compressible material 306 is non-compressible. The expansion of the hydrocarbon reactive polymer 304 causes the nanotubes and/or carbon particles in the hydrocarbon reactive polymer 304 to separate which lowers the conductivity of the hydrocarbon reactive polymer layer 304. In some cases, and depending upon the concentration of the carbon nanotubes and/or carbon particles in the hydrocarbon reactive polymer layer 304, the hydrocarbon reactive polymer layer 304 may expand sufficiently to cause the hydrocarbon reactive polymer layer 304 to have less conductivity or become non-conductive at the location where the hydrocarbons have penetrated the expandable, permeable protective outer cover 302 and have been absorbed by the hydrocarbon reactive polymer 304. A lower conductivity or loss of conductivity of the hydrocarbon reactive polymer 304 causes a change in impedance between the center conductor 308 and the hydrocarbon reactive polymer 304. A change in impedance can then be detected and the location of that change of impedance on the cable can be determined using a time domain reflectometer, as described above.

In an alternative embodiment, the expandable, permeable protective outer cover 302 can be eliminated. In this embodiment, the hydrocarbon reactive polymer 304 can be made sufficiently durable so that an expandable, permeable protective outer cover 302 is not needed. Polymer layers can be constructed of polymers that are sufficiently durable to withstand the wear and tear that a cable may be subjected to during installation and use.

Figure 4:
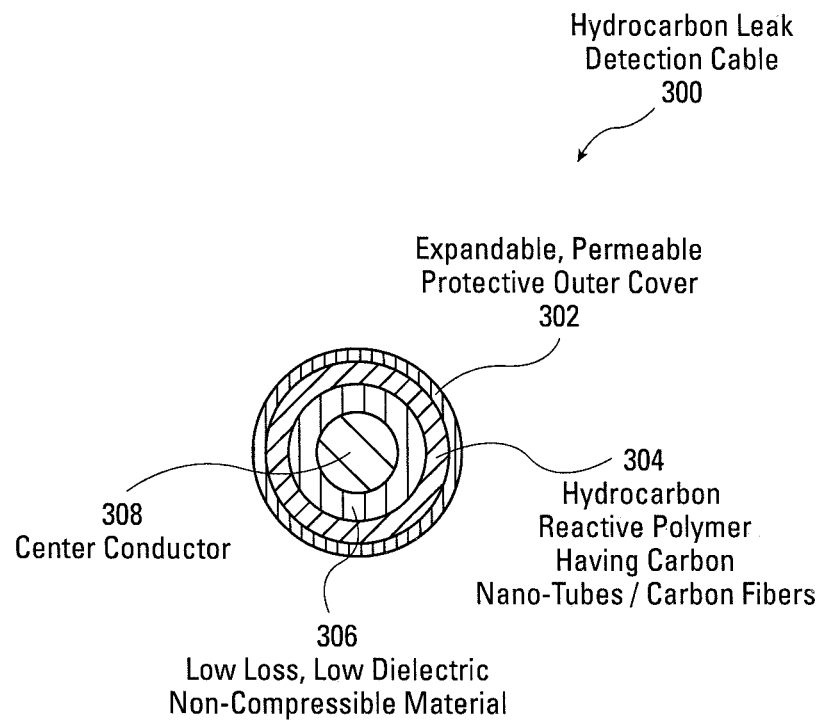
FIG. 4 is a cross-sectional view of the embodiment of the hydrocarbon leak detection cable of FIG. 3.

FIG. 4 is a cross-sectional view of the embodiment of the hydrocarbon leak detection cable 300 illustrated in FIG. 3. As illustrated in FIG. 4, the hydrocarbon leak detection cable 300 has an expandable, permeable protective outer cover 302 which surrounds a hydrocarbon reactive polymer layer 304 having carbon nanotubes and/or carbon fibers. A low loss, low dielectric non-compressible material 306 surrounds a center conductor 308. The low loss, low dielectric non-compressible material 306 may be a Teflon based polymer, polyethylene, or an acrylic such as LDPE, PTFE, PEEK, PFN and many others. Other low loss polymers such as HDPE, hard rubber, silicon, etc. may be sufficiently dense and have a sufficiently low dielectric and low loss characteristics to be used for the low loss, low dielectric non-compressible material 306. The driving factors in determining the selection of the low loss, low dielectric non-compressible material 306 are that the material is cost effective and it can function as a low loss dielectric. In addition, with regard to the embodiment of FIG. 1, the low loss dielectric must be compressible. With regard to the embodiments of FIGS. 3 and 4, the low loss dielectric must be substantially non-compressible, i.e., having a compressibility of less than 10% with respect to the forces created by the hydrocarbon reactive polymer 304 in the hydrocarbon leak detection cable 300. As such, the term "non-compressible" as used throughout this disclosure, and in the claims, is not an absolute term and some compression can occur. Again, compression less than 10% of the diameter of a "non-compressible" material is allowable.

Figure 5:
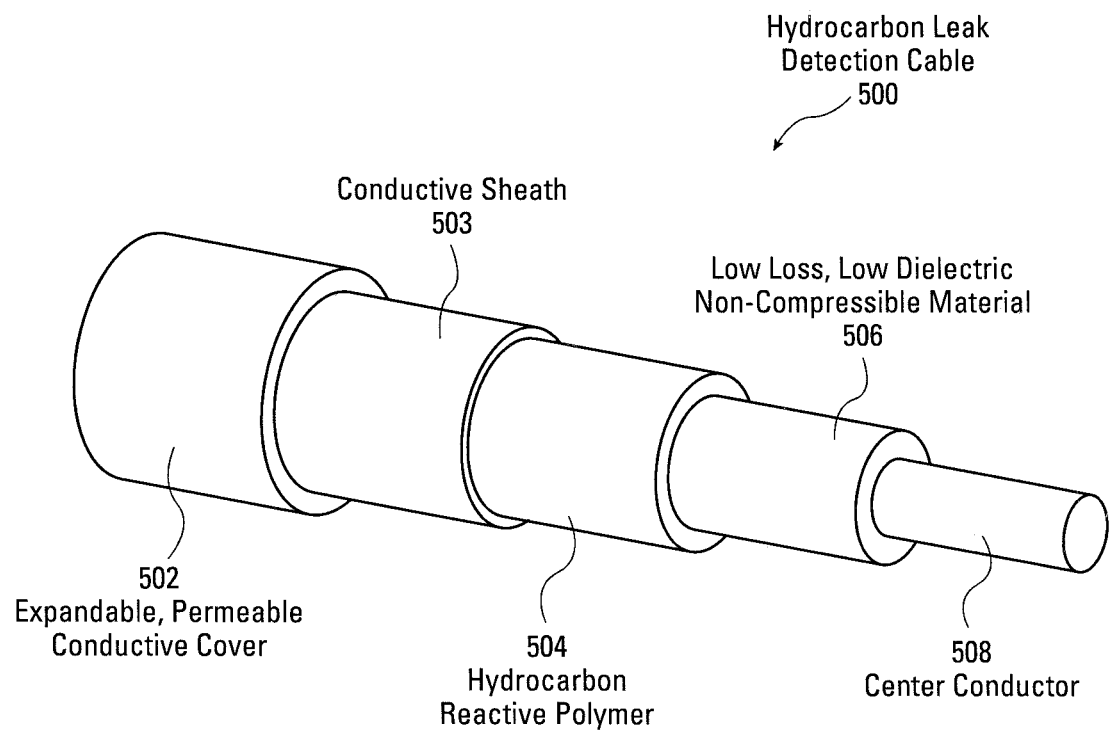
FIG. 5 is a partial cut-away view of another embodiment of the hydrocarbon leak detection cable.

FIG. 5 is another embodiment of a hydrocarbon leak detection cable 500. As illustrated in FIG. 5, the hydrocarbon leak detection cable 500 has an expandable, permeable conductive cover 502. The expandable, permeable conductive cover 502 can be constructed in the same manner as the expandable, permeable protective outer cover 302 of FIG. 3 to provide a protective, permeable cover that is abrasion resistant and capable of protecting the hydrocarbon leak detection cable 500. In an alternative embodiment, the expandable, permeable conductive cover 502 can be eliminated. As such, the hydrocarbon reactive polymer 504 can be made sufficiently durable so that an expandable, permeable conductive cover 502 is not needed. Polymer layers and conductive sheath 503 can be constructed of materials that are sufficiently durable to withstand the wear and tear that a cable may be subjected to during installation and use. Under the expandable, permeable conductive cover 502, when present, is a conductive sheath 503. The conductive sheath 503 may be constructed from materials that allow the conductive sheath 503 to expand, such as a loosely wound wire braid, other conductive braid, or a conductive, expandable tape having perforations or other materials. An expandable, porous polymer material that is coated with or mixed with a conductive material, such as carbon particles or carbon nanoparticles, can also be used. The hydrocarbon reactive polymer 504 absorbs hydrocarbons that are transmitted through the expandable, permeable conductive cover 502 and the conductive sheath 503. As the hydrocarbon reactive polymer 504 absorbs the hydrocarbons, the hydrocarbon reactive polymer 504 expands outwardly since the underlying layer is a low loss, low dielectric non-compressible material 506. The forces created by the expansion or swelling of the hydrocarbon reactive polymer 504 are transferred to the conductive sheath 503 and the expandable, permeable conductive cover 502, which causes both the conductive sheath 503 and the expandable, permeable conductive cover 502 to move in an outward direction away from the center conductor 508. The low loss, low dielectric non-compressible material 506 may be similar to the low loss, low dielectric non-compressible material 306, described with respect to FIG. 3. The center conductor 508 may comprise any conductive material capable of transmitting electrical signals.

When the hydrocarbon reactive polymer 504 of FIG. 5 expands, it causes the conductive sheath 503 and the expandable, permeable conductive cover 502, when present, to move in an outward direction and create a greater distance between the conductive sheath 503 and the center conductor 508. Since the conductive sheath 503 and the expandable, permeable conductive cover 502 are moved farther away from the center conductor 508, the impedance of the hydrocarbon leak detection cable 500 changes at that location. A change in the impedance at that location, where the hydrocarbon has caused the hydrocarbon reactive polymer 504 to swell or expand, causes a reflection of an interrogation pulse from a time domain reflectometer. In that manner, the location of the hydrocarbon leak can be determined, as described above. Both the expandable, permeable conductive cover 502, when present, and the conductive sheath 503 provide conduction along the length of the hydrocarbon leak detection cable 500 so that multiple leaks can be detected along the length of the hydrocarbon leak detection cable 500.

Figure 6:
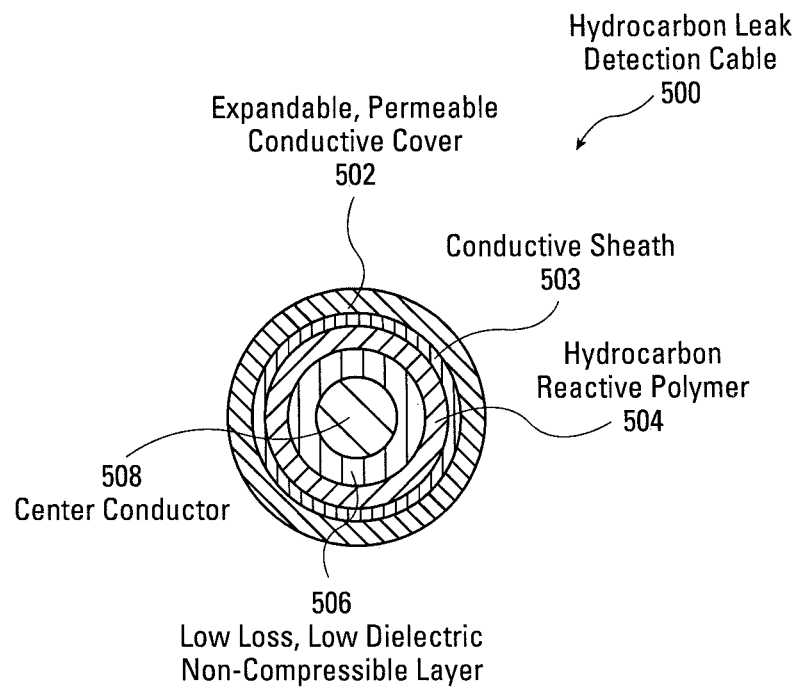
FIG. 6 is a cross-sectional view of the embodiment of the hydrocarbon leak detection cable of FIG. 5.

FIG. 6 is a cross-sectional view of the embodiment of the hydrocarbon leak detection cable 500 illustrated in FIG. 5. As illustrated in FIG. 6, the expandable, permeable conductive cover 502 allows hydrocarbons to permeate the expandable, permeable conductive cover 502 and provides a protective cover for the hydrocarbon leak detection cable 500. The expandable, permeable conductive cover 502 is capable of expanding and has sufficient elasticity to allow the expandable, permeable conductive cover 502 to return to its original size. Hydrocarbons that penetrate the expandable, permeable conductive cover 502 contact the conductive sheath 503. Conductive sheath 503 is also permeable to hydrocarbons and allows the hydrocarbons to pass through the conductive sheath 503 to the hydrocarbon reactive polymer 504. Again, conductive sheath 503 may comprise an expandable material that has sufficient elasticity to return to its original size and shape and allow hydrocarbons to pass through the conductive sheath 503 to the hydrocarbon reactive polymer 504. The conductive sheath 503 may be a conductive elastic tape with perforations to allow the hydrocarbons to pass through the conductive sheath 503, an elastic conductive mesh, or an elastic material covered with a conductive coating or other similar material. Conductive sheath 503 may also be made from a polymer that is porous to hydrocarbons and infused with conductive particles to be conductive. The conductive sheath 503 can be made from a polymer that is sufficiently resistant to wear that the expandable, permeable conductive cover 502 can be eliminated. Low loss, low dielectric non-compressible layer 506 surrounds the center conductor 508. Since the low loss, low dielectric non-compressible layer 506 does not compress, forces created by the expansion of the hydrocarbon reactive polymer 504 are directed outwardly to expand the conductive sheath 503 in an outward direction and increase the distance between the conductive sheath 503 and the center conductor 508. This causes a change in the impedance of the hydrocarbon leak detection cable 500 which can be detected by a time domain reflectometer.

Figure 7:
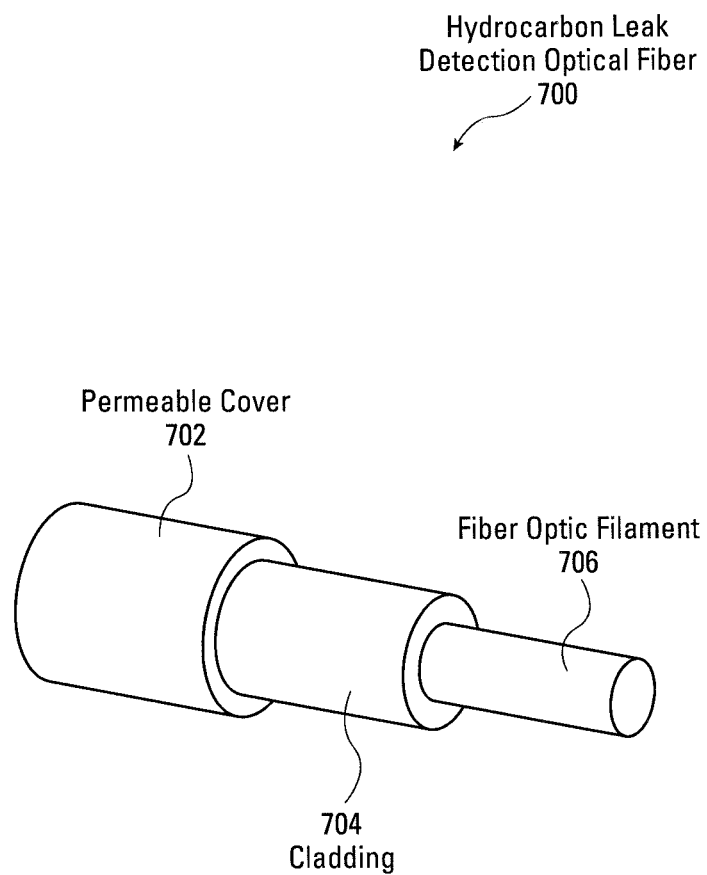
FIG. 7 is a partial cut-away view of a hydrocarbon leak detection optical fiber.

FIG. 7 is an embodiment of a hydrocarbon leak detection optical fiber 700. As illustrated in FIG. 7, hydrocarbon leak detection optical fiber 700 has a permeable cover 702 that protects the hydrocarbon leak detection optical fiber 700 from abrasion, wear, and punctures, and is permeable to hydrocarbons. Various silicon permeable membrane materials can be utilized as a hydrocarbon permeable membrane. This is more fully disclosed in a paper entitled "Membranes for Hydrocarbon Fueled Processing and Separation" by A. Gugliuzza, A. Basile that appears in *Advanced Membranes Science and Technology For Sustainable Energy and Environmental Applications,* 2011. Silicone rubber also has permeability characteristics to hydrocarbon as disclosed in the Society for the Advancement of Material and Process Engineering, Fall Technical Conference 2006 "Global Advances and Materials in Process Engineering" proceedings, Coatings and Sealants Section, Nov. 6, 2006 Dallas Texas in a paper entitled "The Permeability Characteristics of Silicone Rubber" by Haibing Zhang PHD, Andy Cloud Arlon Silicone Technologies Division, 1100 Governor Lea Road, Bear, Delaware 19701. As such, various membranes exist that are permeable to hydrocarbons including silicone rubber and various rubber materials, as disclosed above.

The fiber optic filament 706 of FIG. 7 is surrounded by cladding 704 to create the optical portion of the hydrocarbon leak detection optical fiber 700. The interface between the cladding 704 and the fiber optic filament 706 creates a reflective surface which causes light to be reflected and transmitted through the fiber optic filament 706. Cladding 704 may be made from a hydrocarbon reactive material such as acrylic that can swell to compress the fiber optic filament 706 and create a reflection in the optical signals that are being transmitted through the fiber optic filament 706. Alternatively, cladding 704 can interrupt the reflective interface between the cladding 704 and the fiber optic filament 706 such as by changing the reflectivity of the interface between the cladding 704 and fiber optic filament 706 by changing its structure or color. Light signals passing through the fiber optic filament 706 will then be scattered and will be reflected back to the source. Reflected waves can be detected and the length of time between the emission of an optical signal and the return of a reflected wave can be measured to determine the location of a leak on the hydrocarbon leak detection optical fiber 700. As such, scattered light that is reflected at the location of the leak creates an indication of the location of the hydrocarbon leak. The permeable cover 702 can either be expanding or non-expanding. Cladding 704 may swell and if the permeable cover 702 is expandable, a disruption of the optical interface between the cladding 704 and the fiber optic filament 706 may be created. In another embodiment, if the cladding 704 is hydrocarbon permeable, hydrocarbon liquid can seep through the cladding 704 to interrupt the reflective interface between the cladding 704 and the fiber optic filament 706 to change the reflectivity of the hydrocarbon leak detection optical fiber 700 and create scattered light.

Figure 8:
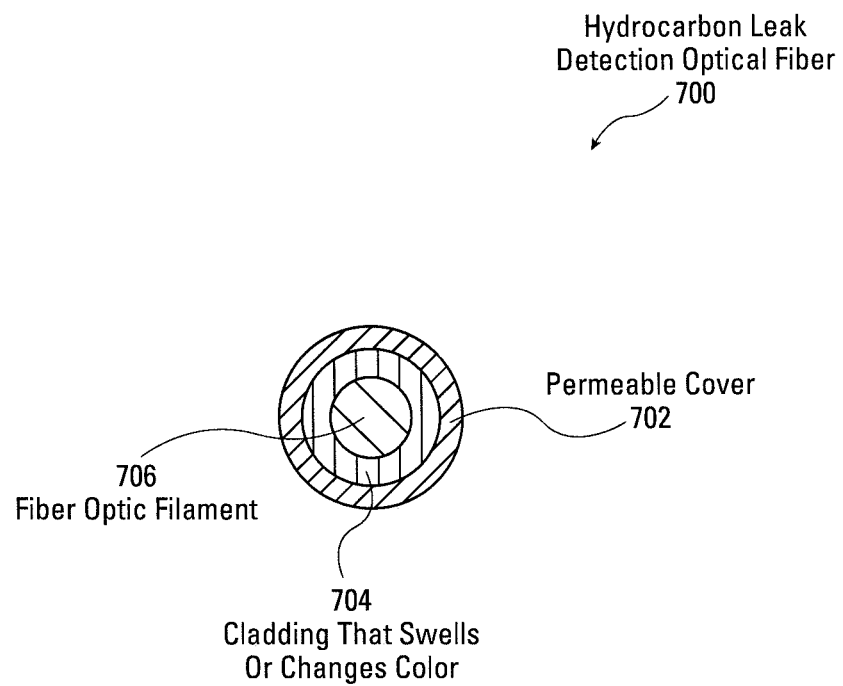
FIG. 8 is a cross-sectional view of the embodiment of the hydrocarbon leak detection optical fiber of FIG. 7.

FIG. 8 is a cross-sectional view of the hydrocarbon leak detection optical fiber 700 illustrated in FIG. 7. As illustrated in FIG. 8, the permeable cover 702, which can be expanding, or non-expanding, surrounds the cladding 704 that swells or changes color. Fiber optic filament 706 is surrounded by the cladding 704.

Figure 9:
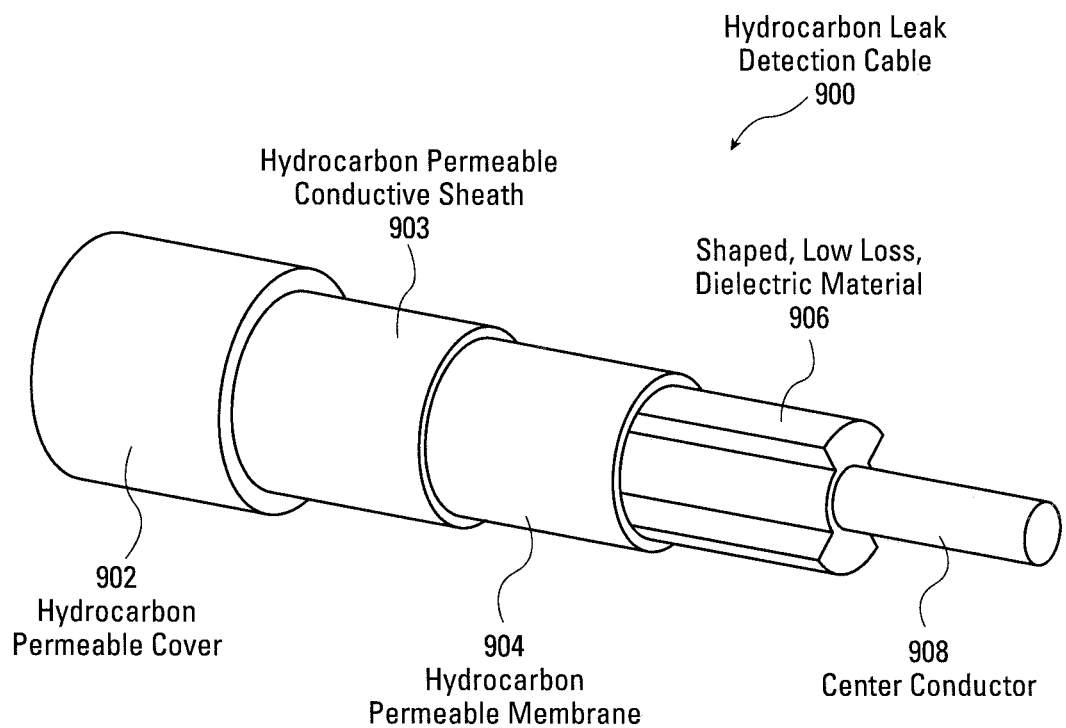
FIG. 9 is a partial cut-away view of another embodiment of the hydrocarbon leak detection cable.

FIG. 9 is a cut-away view of another embodiment of a hydrocarbon leak detection cable 900. As illustrated in FIG. 9, a hydrocarbon permeable cover 902 surrounds a hydrocarbon permeable conductive sheath 903. A hydrocarbon permeable membrane 904 is also permeable to hydrocarbons which allows hydrocarbons to penetrate the hydrocarbon permeable membrane 904. Hydrocarbon permeable materials such as silicone rubber and other rubbery materials, as disclosed in the papers cited with respect to the description of FIG. 7, can be utilized here for the hydrocarbon permeable cover 902, the hydrocarbon permeable conductive sheath 903 and the hydrocarbon permeable membrane 904. A shaped, low loss, dielectric material 906 is disposed between the hydrocarbon permeable membrane 904 and the center conductor 908. Liquid hydrocarbons that permeate the hydrocarbon permeable cover 902, the hydrocarbon permeable conductive sheath 903 and the hydrocarbon permeable membrane 904, fill the openings or spaces around the shaped, low loss, dielectric material 906. The hydrocarbons disposed within the spaces adjacent to the shaped, low loss, dielectric material 906, cause a change in impedance between the center conductor 908 and the hydrocarbon permeable conductive sheath 903, which can be detected by a time domain reflectometer. Again, the hydrocarbon permeable cover 902 can be eliminated if hydrocarbon permeable conductive sheath 903 is made sufficiently rugged to resist wear.

Figure 10:
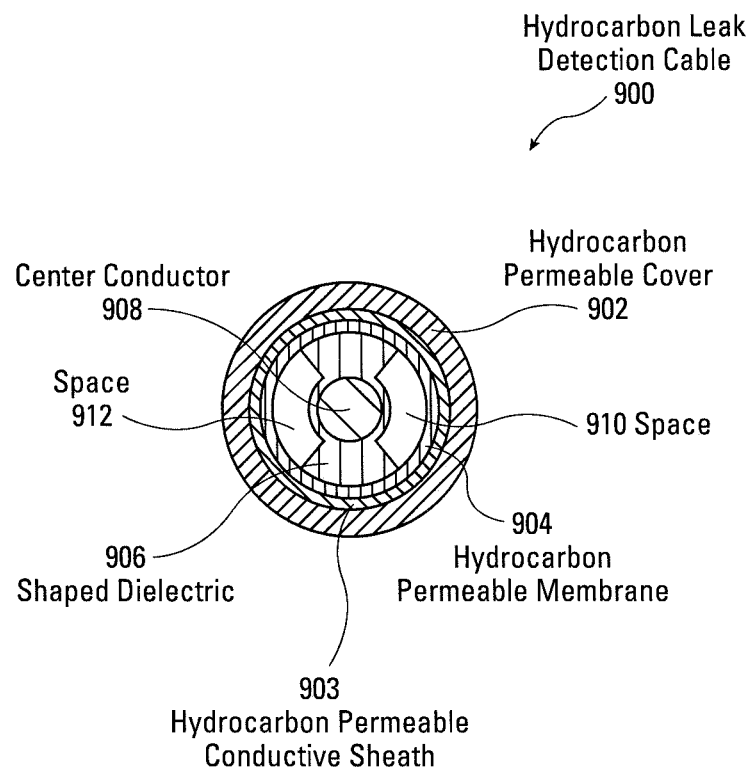
FIG. 10 is a cross-sectional view of the hydrocarbon leak detection cable of FIG. 9.

FIG. 10 is a cross-sectional view of the embodiment of the hydrocarbon leak detection cable 900, illustrated in FIG. 9. As illustrated in FIG. 10, the hydrocarbon permeable cover 902 allows hydrocarbons to pass through to hydrocarbon permeable conductive sheath 903. Hydrocarbon permeable conductive sheath 903 also allows the hydrocarbons to permeate the hydrocarbon permeable conductive sheath 903 to the hydrocarbon permeable membrane 904. Hydrocarbons then enter the openings or spaces 910, 912 to create a change in impedance of the hydrocarbon leak detection cable 900. Openings or spaces 910 and 912 are created by the shape of the shaped dielectric 906. A change in impedance can be detected between the center conductor 908 and the hydrocarbon permeable conductive sheath 903 as a result of the hydrocarbon liquid deposited in openings or spaces 910, 912.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting hydrocarbon leaks using a hydrocarbon leak detection cable comprising:

providing a hydrocarbon reactive polymer in said hydrocarbon leak detection cable, that expands in the presence of hydrocarbons, and generates forces in an inward direction on a conductive sheath towards a center conductor of said hydrocarbon leak detection cable;

providing a dielectric compressible layer that is disposed around said center conductor to provide a uniform input impedance along the length of said hydrocarbon leak detection cable;

compressing said dielectric compressible layer in response to said forces at a location where said hydrocarbon reactive polymer expands in the presence of hydrocarbons so that said conductive sheath moves closer to said center conductor at said location which changes impedance of said hydrocarbon leak detection cable at said location where said conductive sheath is closer to said center conductor that results from said hydrocarbons contacting said hydrocarbon reactive polymer;

using a time domain reflectometer to generate a pulse to detect said location by detecting where said impedance of said hydrocarbon leak detection cable changes.

2. The method of claim 1 further comprising:

using a non-expandable permeable cover that surrounds said hydrocarbon reactive polymer that directs said forces in said inward direction when said hydrocarbon reactive polymer expands in the presence of hydrocarbons.

3. The method of claim 2 wherein said method of using said non-expandable permeable cover comprises using a plastic monofilament fiber that is braided and has openings.

4. The method of claim 3 wherein said method of using a plastic monofilament fiber comprises using a plastic monofilament fiber that provides approximately 80% coverage and approximately 20% open, permeable space.

5. The method of claim 2 wherein said method of using said non-expandable permeable cover comprises using a polymer tape having perforations to allow passage of said hydrocarbons.

6. The method of claim 2 wherein said method of using said non-expandable permeable cover comprises using a non-expandable permeable cover that expands by less than 10% of its direction.

7. The method of claim 2 wherein said method of providing a hydrocarbon reactive polymer comprises providing a hydrocarbon reactive polymer that comprises a petroleum fluid gel that further comprises polyolefin hydrophobic polymers that demonstrate selective absorption of hydrocarbon molecules in water solutions.

8. The method of claim 2 wherein said method of providing a hydrocarbon reactive polymer comprises providing a hydrocarbon reactive polymer that is a nitrile based material that absorbs said hydrocarbons.

9. The method of claim 2 wherein said method of generating forces in an inward direction on said conductive sheath comprises generating forces in an inward direction on a conductive polymer coated mesh.

10. The method of claim 2 wherein said method of generating forces in an inward direction on said conductive sheath comprises generating forces in an inward direction on a stainless steel sheath.

11. The method of claim 2 wherein said method of generating forces in an inward direction on said conductive sheath comprises generating forces in an inward direction on a copper sheath.

12. The method of claim 2 wherein said method of generating forces in an inward direction on said conductive sheath comprises generating forces in an inward direction on a tin plated copper sheath.

13. The method of claim 2 further comprising:

providing a dielectric compressible layer with a predetermined dielectric constant and disposed around said center conductor to achieve a particular input impedance.

14. The method of claim 13 wherein said method of providing a dielectric compressible layer comprises providing a dielectric compressible layer that has a dielectric constant and a uniform spacing to achieve an input impedance of approximately 50 ohms.

15. The method of claim 13 wherein said method of providing a dielectric compressible layer comprises providing a dielectric compressible layer of polymer based foam.

16. The method of claim 1 wherein said method of providing a hydrocarbon reactive polymer comprises providing a silicone foam hydrocarbon reactive polymer that can be dried to remove said hydrocarbons.

17. The method of claim 1 wherein said method of providing a hydrocarbon reactive polymer comprises providing a hydrocarbon reactive polymer that can be cleaned with solvents to removed hydrocarbons.

18. The method of claim 17 wherein said method providing a hydrocarbon reactive polymer that can be cleaned with solvents comprises providing a hydrocarbon reactive polymer that can be cleaned with isopropyl alcohol.

19. The method of claim 18 wherein said method providing a hydrocarbon reactive polymer that can be cleaned with solvents comprises providing a hydrocarbon reactive polymer that can be cleaned with glycerin.

20. The method of claim 19 wherein said method providing a hydrocarbon reactive polymer that can be cleaned with solvents comprises providing a hydrocarbon reactive polymer that can be cleaned with propylene glycol.

* * * * *